(No Model.)

J. WALE.
HAND SLED.

No. 586,644. Patented July 20, 1897.

Witnesses:
L. C. Hills.
A. L. Hough.

Inventor:
John Wale,
by Franklin H. Hough
Atty.

United States Patent Office.

JOHN WALE, OF NEBRASKA CITY, NEBRASKA.

HAND-SLED.

SPECIFICATION forming part of Letters Patent No. 586,644, dated July 20, 1897.

Application filed March 22, 1897. Serial No. 628,761. (No model.)

*To all whom it may concern:*

Be it known that I, JOHN WALE, a citizen of the United States, residing at Nebraska City, in the county of Otoe and State of Nebraska, have invented certain new and useful Improvements in Hand-Sleds; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in hand-sleds, and especially to the construction of a sled which is provided with pivoted handle-strips, which may be utilized as brake or steering levers, and when not used as such may be held to projecting bracket-arms by any suitable means.

More specifically the invention resides in the provision of handle-strips, which are pivoted at their middle portions to plates or extensions on opposite sides of the sled-top, and each end of the said handles recessed or cut away and designed to rest upon and be locked to brackets when the handles are not adapted for use in steering or as brakes.

To these ends and to such others as the invention may pertain, the same consists, further, in the novel construction, combination, and adaptation of the parts, as will be hereinafter more fully described, and then specifically defined in the appended claims.

The invention is clearly illustrated in the accompanying drawings, which, with the letters of reference marked thereon, form a part of this specification, and in which drawings—

Figure 1:
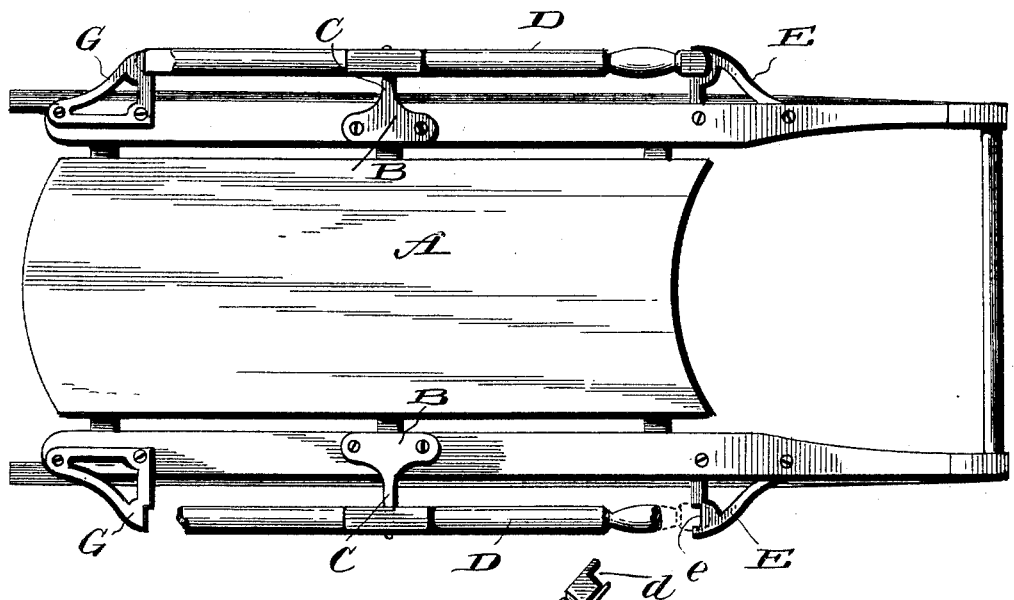
Figure 2:
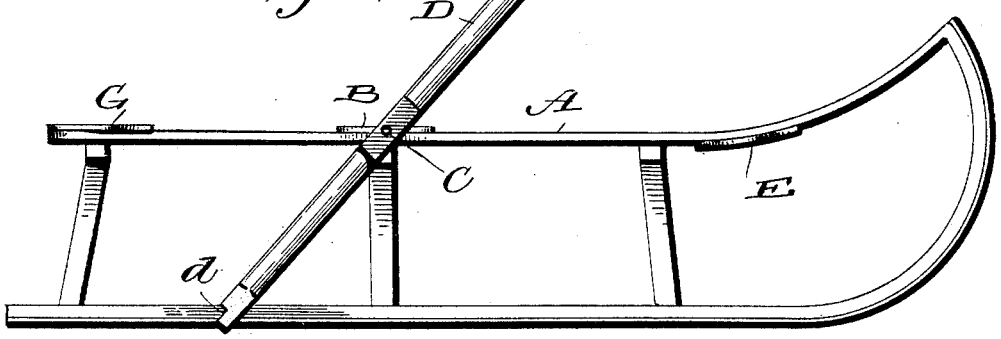

Figure 1 is a plan view of the handle-strips locked in a horizontal position to the projections on the sled. Fig. 2 is a perspective view of the sled, showing the handle-strips down in position for use as brakes or steering-levers.

Reference now being had to the details of the drawings by letter, A designates a sled which has secured to its opposite sides, near its middle portions, the plates B, having integral pins C, on which are pivoted the handle-strips D. Each end of the said strips is cut away, as seen at $d$, and on each side of the sled, opposite the forward ends of the said handle-strips, are secured the brackets E, each of which is notched, as shown at $e$, to receive an end of the handle-strip. When the handle-strip is held in a horizontal position, the projecting portion of the handle rests on the flat upper portion of the bracket and is held from moving laterally by the notched portion engaging with the strip. The rear ends of the handle-strips are also recessed, as shown in the drawings, and engage with the notched plates G, secured near the rear end of the sled on opposite sides thereof. The recessed portions at the rear ends of the handle-strips are cut away at right angles to the direction of the recesses at the forward ends, so that when the strips are turned down for use in steering or being used as brakes the notched or recessed ends of the strips extend down a sufficient distance below the runners to be utilized as brakes by their engaging with the snow beneath.

In order to hold the strips in a horizontal position, suitable buttons K are provided, which are secured to the handle-strips, and, when locked, engage with the under sides of the forward brackets.

Having thus described my invention, what I claim to be new, and desire to secure by Letters Patent, is—

1. In combination with a sled, the handle-strips pivoted to the sides of the sled, brackets to receive the ends of the said strips, and buttons for holding the ends of the strips to the brackets, substantially as shown and described.

2. In combination with a hand-sled, the handle-strips pivoted to plates on the sides thereof, the said handle-strips recessed out at their ends, notched brackets secured to the sides of the sled and designed to receive the forward ends of the strips, buttons for holding the strips to the brackets, arranged substantially as shown and described.

In testimony whereof I affix my signature in presence of two witnesses.

JOHN WALE.

Witnesses:
 F. T. DAVIS,
 HUGH SEYMOUR.